United States Patent
Kulkarni et al.

(10) Patent No.: US 10,063,665 B2
(45) Date of Patent: Aug. 28, 2018

(54) SYSTEM AND METHOD TO ELIMINATE DUPLICATE BYTE PATTERNS IN NETWORK STREAMS

(71) Applicant: ACTMOBILE NETWORKS, INC., Pleasanton, CA (US)

(72) Inventors: Pankaj G. Kulkarni, Koramangala Bangalore (IN); Phaniraj M. Raghavendra, Bangalore (IN); Rakesh Padinjeredil, Mysore (IN); Andrew Foss, San Jose, CA (US); John Coronella, Winchester, MA (US)

(73) Assignee: ACTMOBILE NETWORKS, INC., Pleasanton, CA (US)

( * ) Notice: Subject to any disclaimer, the term of this patent is extended or adjusted under 35 U.S.C. 154(b) by 94 days.

(21) Appl. No.: 15/047,591

(22) Filed: Feb. 18, 2016

(65) Prior Publication Data

US 2016/0241479 A1 Aug. 18, 2016

Related U.S. Application Data

(60) Provisional application No. 62/117,879, filed on Feb. 18, 2015.

(51) Int. Cl.
| | |
|---|---|
| *H04L 29/08* | (2006.01) |
| *G06F 17/30* | (2006.01) |
| *H04L 29/06* | (2006.01) |
| *G06F 21/60* | (2013.01) |
| *H04W 4/18* | (2009.01) |

(52) U.S. Cl.
CPC ............ *H04L 67/42* (2013.01); *G06F 21/606* (2013.01); *H04L 63/062* (2013.01); *H04L 67/2842* (2013.01); *H04W 4/18* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 5,889,860 | A | 3/1999 | Eller et al. |
| 7,809,820 | B2 | 10/2010 | Stepin et al. |
| 8,103,783 | B2 | 1/2012 | Plamondon |
| 8,681,813 | B2 | 3/2014 | Jain et al. |
| 9,509,663 | B2 | 11/2016 | Bollay et al. |
| 2009/0132619 | A1* | 5/2009 | Arakawa ............... G06F 3/0605 |
| 2011/0231649 | A1 | 9/2011 | Bollay et al. |
| 2012/0158828 | A1 | 6/2012 | Ireland et al. |
| 2012/0284461 | A1* | 11/2012 | Larin .................. G06F 9/30149 |
| | | | 711/125 |
| 2013/0031337 | A1* | 1/2013 | Larin .................... G06F 9/3017 |
| | | | 712/226 |
| 2013/0054523 | A1* | 2/2013 | Anglin .............. G06F 17/30575 |
| | | | 707/624 |

(Continued)

*Primary Examiner* — Natisha D Cox
(74) *Attorney, Agent, or Firm* — Orrick, Herrington & Sutcliffe, LLP

(57) ABSTRACT

A mobile codec system for reducing network traffic and methods for making and using the same. The mobile codec system reduces duplicate byte patterns for mobile devices. The mobile codec system is very effective when there is repetition in the data sent by a destination server—which is typically is a website serving HTTP content. A mobile codec enables many individual devices to share one mobile codec service.

20 Claims, 6 Drawing Sheets

(56) References Cited

U.S. PATENT DOCUMENTS

| | | | |
|---|---|---|---|
| 2013/0124621 A1* | 5/2013 | Lepeska | H04L 29/06047 709/203 |
| 2013/0198313 A1 | 8/2013 | Hayton et al. | |
| 2014/0304464 A1* | 10/2014 | Bert | G06F 3/0641 711/105 |
| 2014/0344341 A1 | 11/2014 | Panzer et al. | |

* cited by examiner

SYSTEM AND METHOD TO ELIMINATE DUPLICATE BYTE PATTERNS IN NETWORK STREAMS

CROSS-REFERENCE TO RELATED APPLICATIONS

This application claims priority to U.S. provisional patent application, Ser. No. 62/117,879, filed Feb. 18, 2015. Priority to the provisional patent application is expressly claimed, and the disclosure of the provisional application is hereby incorporated herein by reference in its entirety and for all purposes.

The following United States nonprovisional patent applications are fully owned by the assignee of the present application and are filed on the same date herewith. The disclosure of the nonprovisional patent applications are hereby incorporated herein by reference in their entireties and for all purposes:

"MULTI-STAGE ACCELERATION SYSTEM AND METHOD," U.S. patent application Ser. No. 15/047,587, filed Feb. 18, 2016; and "EXTENDED HTTP OBJECT CACHE SYSTEM AND METHOD," U.S. patent application Ser. No. 15/047,594, filed Feb. 18, 2016.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to network data reduction between two end points, and more particularly, but not exclusively, to network data reduction between two network enabled mobile devices.

BACKGROUND

Mobile devices access data primarily from wireless networks using traditional protocols such as Transmission Control Protocol/Internet Protocol (TCP/IP), Hypertext Transfer Protocol (HTTP), Hypertext Transfer Protocol over Transport Layer Security (also called HTTP Secure or HTTP over Secure Sockets Layer) (HTTPS), etc. These traditional protocols were developed on traditional wired networks where congestion is low and bandwidth is inexpensive and available. As a result, these traditional protocols are less efficient and consume more bandwidth than needed on wireless networks. For example, consumers of cellular data networks are charged by the amount of data that is sent. The more unnecessary or redundant data can be reduced leads to lowered costs. Additionally, wireless bandwidth and scaling is limited by frequency spectrum availability. Therefore, increasing the efficiency of data transmission also increases the limited scalability of wireless networks.

Traditionally, when higher capacity networks were interconnected with lesser capacity Wide Area Network (WAN) links, Byte Caches have been deployed on both ends of the narrow WAN link to remove duplicate data. Byte Caches include a pair of appliances that have a large shared cache of byte patterns. As data flows between the pair of appliances, each appliance learns and stores the byte patterns. Accordingly, when byte patterns are recognized, the bytes can be eliminated and replaced by the caches. These appliances are designed to share very large byte caches across many data streams. Both ends must learn and record the byte patterns and must run complex synchronization protocols.

While this is quite effective for WAN links (i.e., since the byte cache is shared by all of the devices using that link), the byte caches do not work for mobile devices because the mobile device is a network of a single device directly connected to the wireless network. Stated in another way, there is no traffic aggregation point where the traditional byte cache can be deployed.

In view of the foregoing, a need exists for an improved network data reduction system in an effort to overcome the aforementioned obstacles and deficiencies of conventional network systems.

SUMMARY

An improved mobile codec system reduces duplicate byte patterns for mobile devices. The mobile codec system is very effective when there is repetition in the data sent by a destination server—which is typically is a website serving HTTP content. A mobile codec enables many individual devices to share one mobile codec service. This is compared to the traditional byte cache, which operates in one to one pairs.

Figure 1:
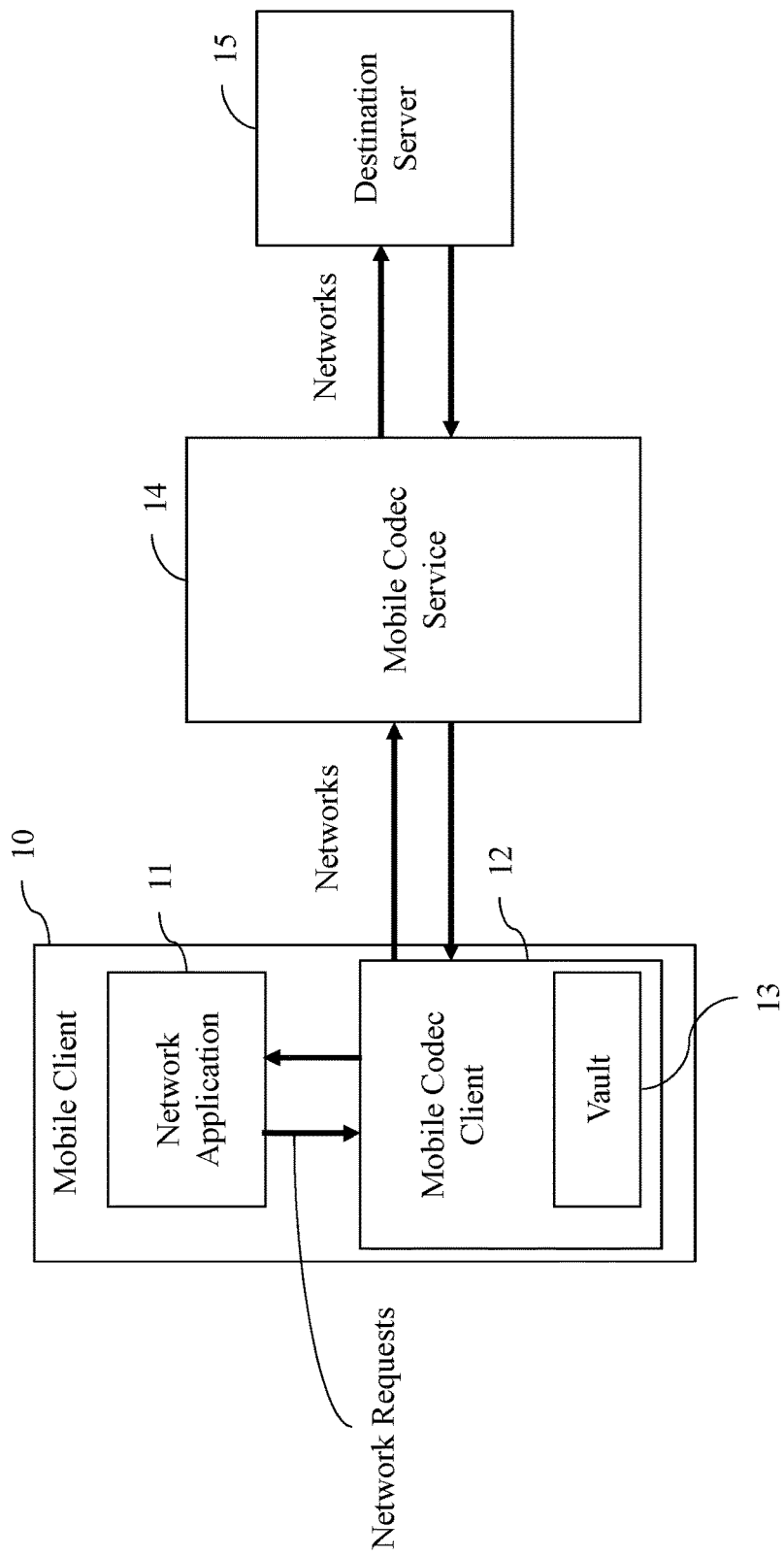
FIG. 1 is a block diagram illustrating an embodiment of a mobile codec system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Turning to FIG. 1, a mobile code system includes a Mobile Codec Service 14 running in the cloud or datacenter and a Mobile Codec Client 12 running on a mobile client 10. The Mobile Codec Client 12 allocates local storage called a Vault 13 and makes the Vault 13 available to the Mobile Codec Service 14. Network Requests from a Network Application 11 running on the Mobile Client 10 are passed through the Mobile Codec Client 12 to the Mobile Codec Service 14. The Mobile Codec Service 14 fetches the response from a Destination Server 15 and sends the response to the Mobile Codec Client 12. The Vault 13 reduces data by eliminating duplicate patterns in the response from the Destination Server 15. The Mobile Codec Client 12 reconstructs the original response data and sends the original response data to the Network Application 11.

As shown in FIG. 1, when a Network Application 11 makes the Network Request (for example, an HTTP request for a web page or a TCP request to download email), the Network Request is intercepted by the Mobile Codec Client 12. The Mobile Codec Client 12 connects to the Mobile Codec Service 14 and requests the Mobile Codec Service 14 to complete the request. The Mobile Codec Service 14 connects to the Destination Server 15, fetches the response from the Destination Server 15 and then sends the data in 'Codec Response' messages to the Mobile Codec Client 12. The Mobile Codec Client 12 reconstructs the response from the 'Codec Response' messages and sends the response to the Network Application 11.

The Mobile Codec Service 14 is responsible for managing the content in the Vault 13. The Mobile Codec Service 14 populates the Vault 13 with byte patterns, references those byte patterns with sequence numbers and keys, and provides the miss recovery service when a referenced byte pattern does not exist in the Vault 13. By making use of the Vault 13, the system reduces the amount of data transferred between the Mobile Codec Service 14 and the Mobile Codec Client 12 by referencing duplicate byte patterns in the data.

This advantageously solves the problem of scaling the service to millions of individual mobile devices, which cannot share a byte cache. Unlike a traditional byte cache, the Mobile Codec Service 14 does not learn and store the bytes locally; instead, the Mobile Codec Service 14 stores the byte patterns in the Vaults of each of its subscribers. The Mobile Codec Service 14 only needs to store Hash keys for the byte patterns, which are a fraction (e.g., 0.01) the size of the byte patterns they represent.

The Mobile Codec Client 12 is also very efficient for the Mobile Client 10 where CPU cycles are limited. The compute intensive work of scanning data and computing keys is done in the Mobile Codec Service 14, which owns and manages the Vault 13 on the Mobile Client 10. The Mobile Codec Client 12 only needs to replace block references with the original bytes from the Vault 13 when instructed to do by the Mobile Codec Service 14.

Additionally, no cache synchronization protocol is needed, since the Mobile Codec Service 14, not the Mobile Codec Client 12, manages the Vault 13. The Mobile Codec Service 14 has to retain byte patterns only until such time as they are confirmed to be stored in the Vault 13 to support miss recovery in the event that block references pass one another in flight across the network.

Figure 2:
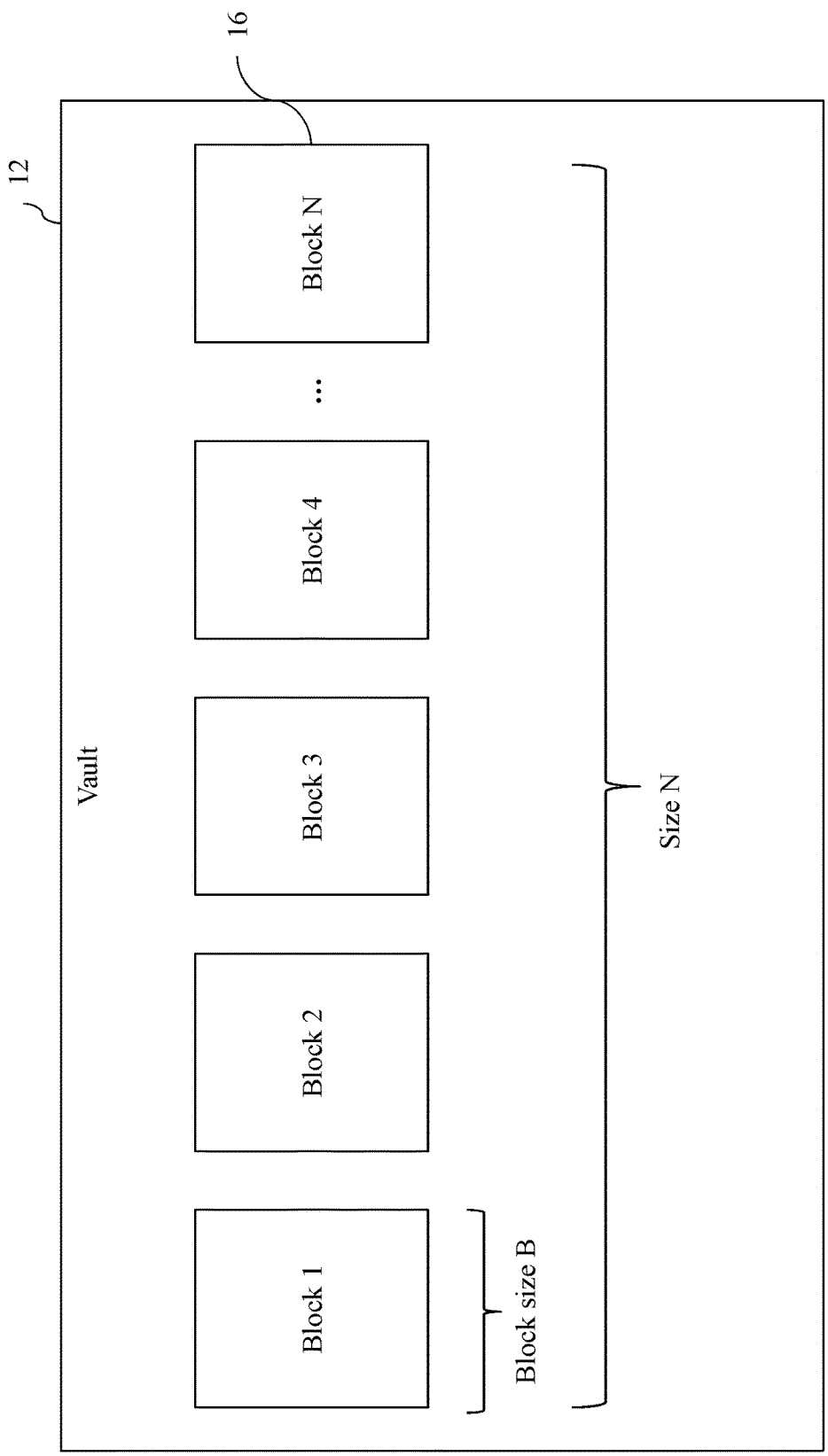
FIG. 2 is a high-level block diagram illustrating an embodiment of the vault of the mobile codec system of FIG. 1.

Turning to FIG. 2, the Vault 13 is defined by two parameters—a number of elements N in the Vault 13, and a block size B bytes. The Vault 13 is an array of length 'N' of 'B' bytes each. For example, the Vault 13 can have 500,000 blocks, each of 512 bytes. The block size and number of blocks in the Vault 13 are configurable based on the amount of space available on the Mobile Client 10 and the repeatable patterns in the content from the Destination Server 15. Smaller block sizes can potentially get more block references, but the tradeoff is lesser gains in the bytes saved per block as the overhead of sending a block reference remains the same.

Figure 3:
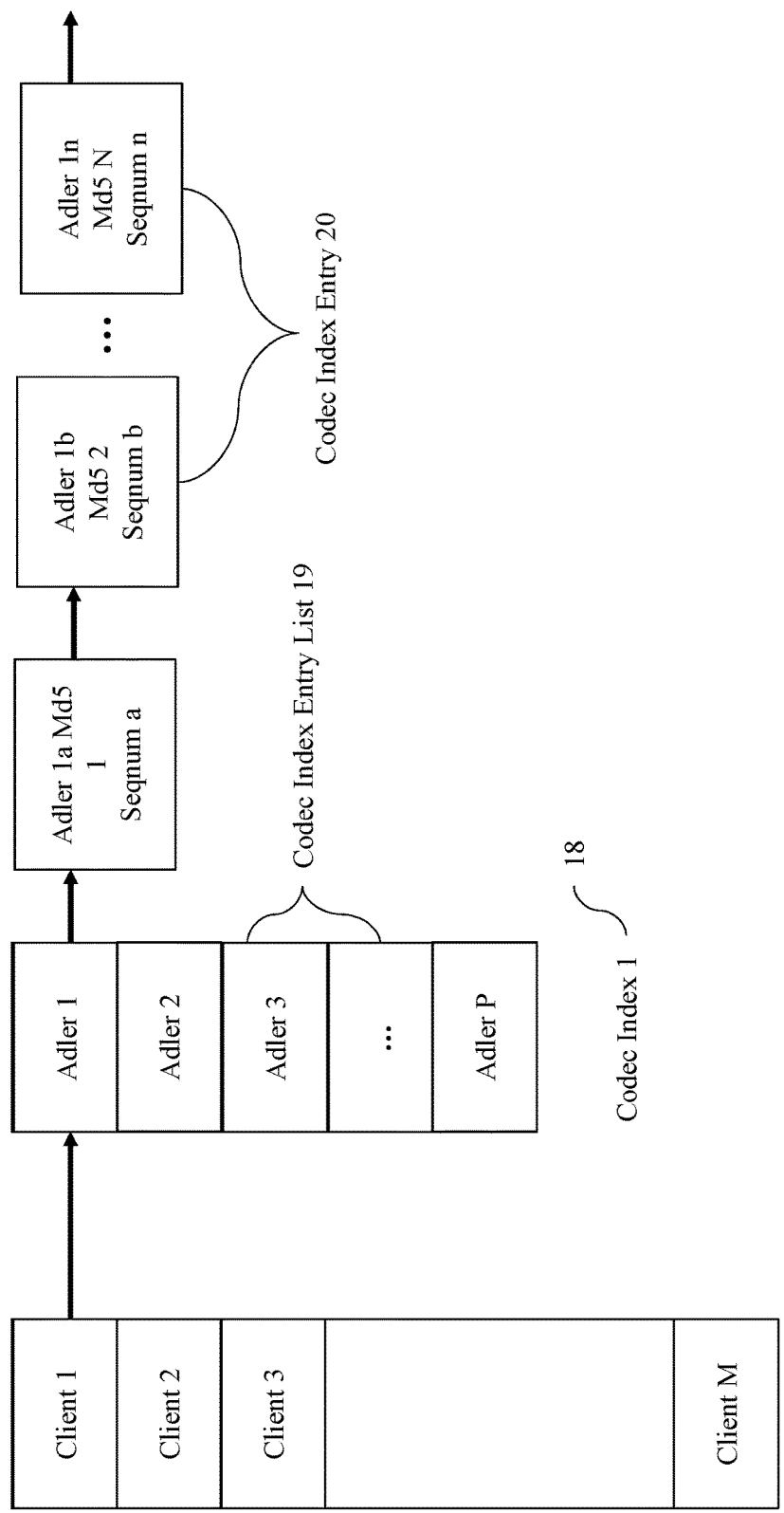
FIG. 3 is a high-level diagram illustrating one embodiment of the Codec Index Manager and its associated data structures used by the Mobile Codec Service of FIG. 1.

FIG. 3 is a block diagram illustrating the data structure of Mobile Codec Service 14 used to maintain the Vaults 13 on the various Mobile Codec Clients 12. For each Mobile Client 10, the data structure maintains the information about the contents of the Vault 13—such as the size N of the Vault 13 and the block size B. For the blocks in the client's vault, the Mobile Codec Service 14 maintains additional data for referencing and updating the Vault 13 on the Mobile Client 10. These data structures are described in detail later.

A Codec Index Manager 17 can include a hash table indexed by a unique identifier of the Mobile Codec Client 12. For each Mobile Codec Client 12, there is a corresponding Codec Index 18. The Codec Index 18 is a hash table of a checksum or hash sum (e.g., adler checksum) of Blocks in the Vault 13. The adler checksum is a standard checksum algorithm, and is used to compute a checksum of a block of size B bytes. The adler checksum efficiently computes the adler checksum of a moving window of B bytes in a stream, also known as a rolling adler. This is useful as the Mobile Codec Service 14 advances bytes in the response stream from the Destination Server 15 looking for matching blocks. Each entry in the Codec Index 18 can represent a linked list Codec Index Entry List 19. The Codec Index Entry List 19 is a list of Codec Index Entries 20. A Codec Index Entry 20 includes at least three fields—an Adler Checksum of a Block BLK, a MD5 Digest of BLK, and a sequence number of BLK in the Vault 13 of the Mobile Codec Client 12. The MD5 Digest is a standard digest algorithm and is a 16-byte digest of the block BLK.

Note that this data structure is an example of how to reference blocks. More efficient implementations can use hash tables of hashtables, in memory or on disk databases, aging mechanisms such as most recently used, saving codec index entries to disk to free up available memory etc. The disclosed system advantageously stores blocks on the Vault 13 of the Mobile Client 12 and manages these blocks on the Mobile Codec Service 14. The blocks are not stored on the Mobile Codec Service 14; only the Adler Checksum, the MD5 Digest of the block, and the sequence number are stored on the Mobile Codec Service 14.

Figure 4:
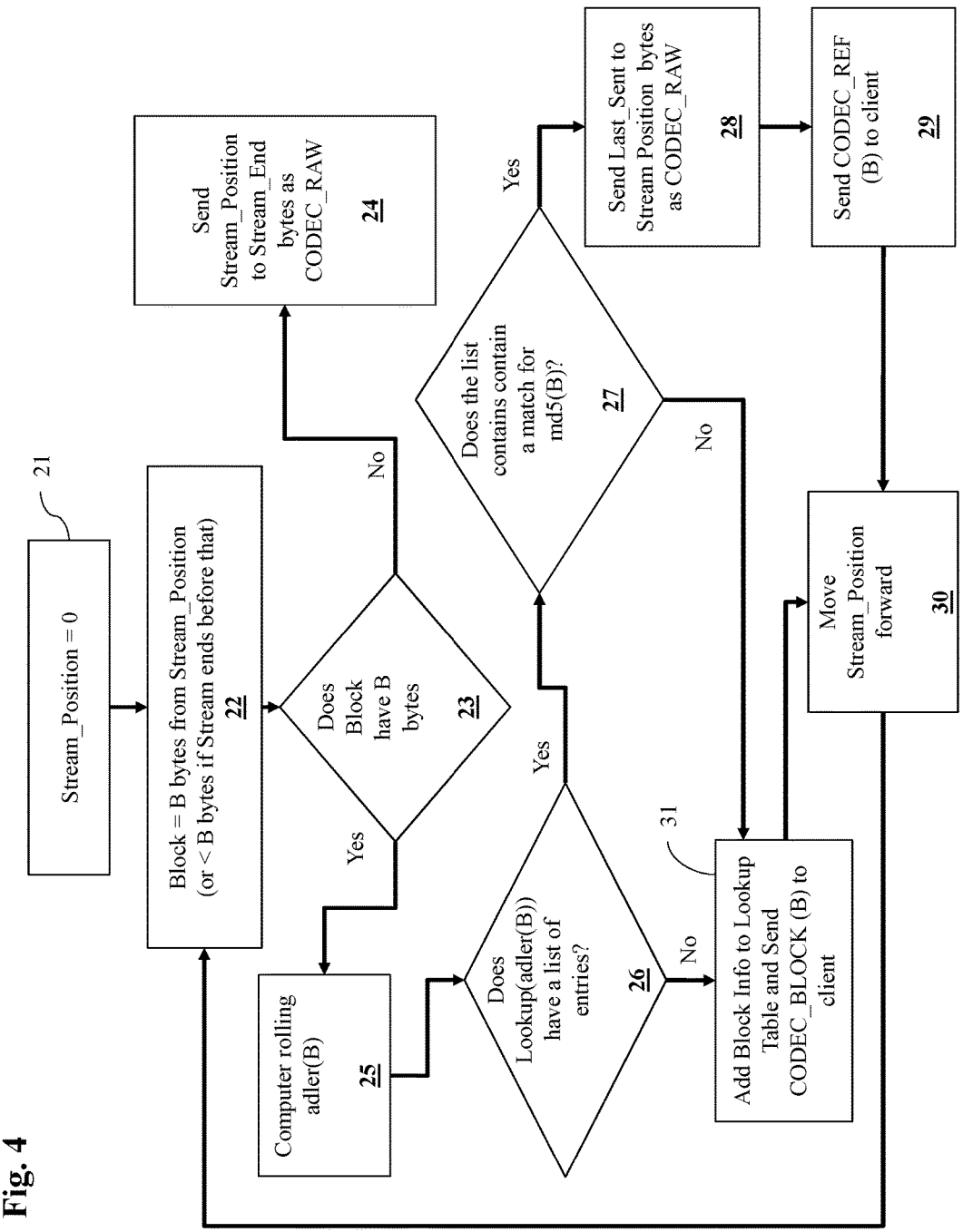
FIG. 4 is a flow chart illustrating one embodiment of processing data from the Destination Server to the Mobile Codec Client on the Mobile Client using the Mobile Codec Service of FIG. 3.

FIG. 4 is a flow chart illustrating one method of streaming data from the Mobile Codec Service 14 to the Mobile Codec Client 12. In step 21, the Mobile Codec Service 14 starts reading from the first byte of the response stream from the Destination Server 15. In step 22, the Mobile Codec Service 14 reads at most B bytes of the stream. In step 23, if the number of bytes read is less than B, the Mobile Codec Service 14 sends this sequence of bytes in a CODEC_RAW message in step 24.

If, in step 23, the number of bytes read is B, the Mobile Codec Service 14 computes the rolling adler ADLER_BLK of this block of bytes BLK in step 25. In step 26, the Mobile Codec Service 14 checks if there is a Codec Index Entry List 19 for ADLER in the Codec Index 18 for the Mobile Codec Client 12. If the result of step 26 is yes, it means that this is a weak match, since different blocks can have the same adler values. If a weak match exists, then, in step 27, the Mobile Codec Service 14 walks the Codec Index Entry List 19 and compares the adler value and MD5 value of BLK with each Codec Index Entry 20.

If the MD5 hash also matches, then it is a strong match and the Mobile Codec Service 14 knows that this block of data is available in the Vault 13 on Mobile Codec Client 12 at the sequence number. Then in step 28, the Mobile Codec Service 14 sends any unsent bytes before the BLK match as CODEC_RAW message, and in step 29, sends the CODEC_REF message about the matching BLK to the Mobile Codec Client 12. The CODEC_REF message contains the sequence number in the Vault 13 to use, the adler and the MD5 hash of BLK. If the Mobile Codec Service 14 does not find a match in step 26 or step 27, this is a new BLK to be stored in the Vault 13 of the Mobile Codec Client 12. In step 31, the new Codec Index Entry 20 is created for this BLK with the next sequence number, adler and MD5 of the BLK and inserted into the Codec Index Entry List 19. The new block BLK is then sent to the client using a CODEC_BLOCK message, in step 31. The CODEC_BLOCK message contains the block data and the sequence number of the block. In step 30, the stream position is advanced—if a CODEC_BLOCK or CODEC_BLOCK_REF was sent, the position is advanced to the next byte after the BLK, otherwise the position is advanced by 1 byte. A rolling adler is used to efficiently compute the adler of the next B bytes for consideration. Then the loop repeats at Step 22. If during the processing, gaps are found in the stream between sending CODEC_BLOCK and CODEC_REF or at the end there are less than B bytes, those are sent as CODEC_RAW messages. To reduce data transmitted to and from the Mobile Codec Service 14 and Mobile Client 12, the transmitted data is compressed using a compression algorithm such as DEFLATE.

Figure 5:
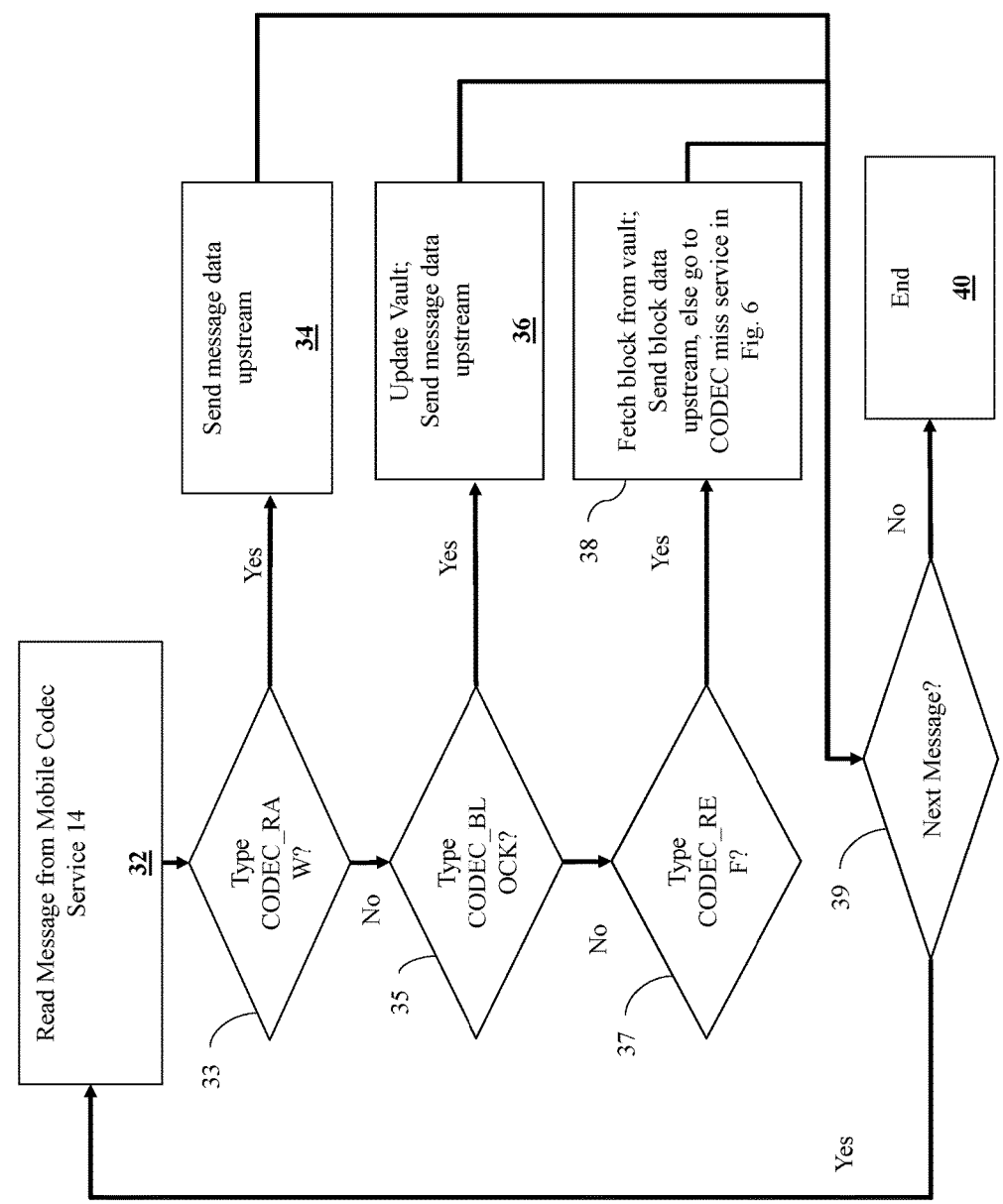
FIG. 5 is a flow chart illustrating one embodiment of processing the response from the Mobile Codec Service of FIG. 3 on the Mobile Codec Client of FIG. 1.

FIG. 5 is a flow diagram illustrating one embodiment for processing Codec Response Messages from the Mobile Codec Service 14 on the Mobile Codec Client 12. In step 32, the Mobile Codec Client 12 starts Codec Response Messages from the Mobile Codec Service 14. In step 33, the Mobile Codec Client 12 checks if the message type is CODEC_RAW. If yes, the Mobile Codec Client 12 reads the raw bytes from the message (indicated by the length field of the CODEC_RAW message) and sends the raw bytes upstream to the Network Application 11. If the answer is no, the Mobile Codec Client 12 checks if the message type is CODEC_BLOCK, in step 35. If the answer to step 35 is yes, then in step 36, the Mobile Codec Client 12 updates the block at the sequence number in its Vault 13 with the block and the sequence number mentioned in the CODEC_BLOCK message, and sends the contents of the block upstream to the Network Application 11. If the answer to step 35 is no, the Mobile Codec Client 12 checks if the message type is CODEC_REF, in step 37. If the answer to step 37 is yes, then in step 38, the Mobile Codec Client 12 looks up the block in its Vault 13 with the sequence number mentioned in the CODEC_REF message.

In step 38, if the block's adler from the CODEC_REF message matches the computed adler of the block in the Vault 13, it is a codec hit and the Mobile Codec Client 12 sends the block from the vault upstream to the Network Application 11. If in step 38, the adler from the CODEC_REF message does not match the computed adler of the block in the Vault 13, then it is a codec miss and the Mobile Codec Client 12 switches to the Codec Miss recovery mode as described in FIG. 6. After steps 34, 36 and 38 send data upstream to the Network Application 11, in step 39, the Mobile Codec Client 12 checks if there is another Codec Response Message pending from the Mobile Codec Service 14. If the answer to step 39 is yes, then the Mobile Codec Client 12 loops back to step 32. If the answer to step 39 is no, then the Mobile Codec Client 12 has processed all the data from the Codec Mobile Service for this request and informs the same to the Network Application 11.

Note that there are often repeated blocks in web content and network content and hence several CODEC_REF messages get sent to the Mobile Codec Client 12 which are much smaller in size compared to the actual blocks of data.

Figure 6:
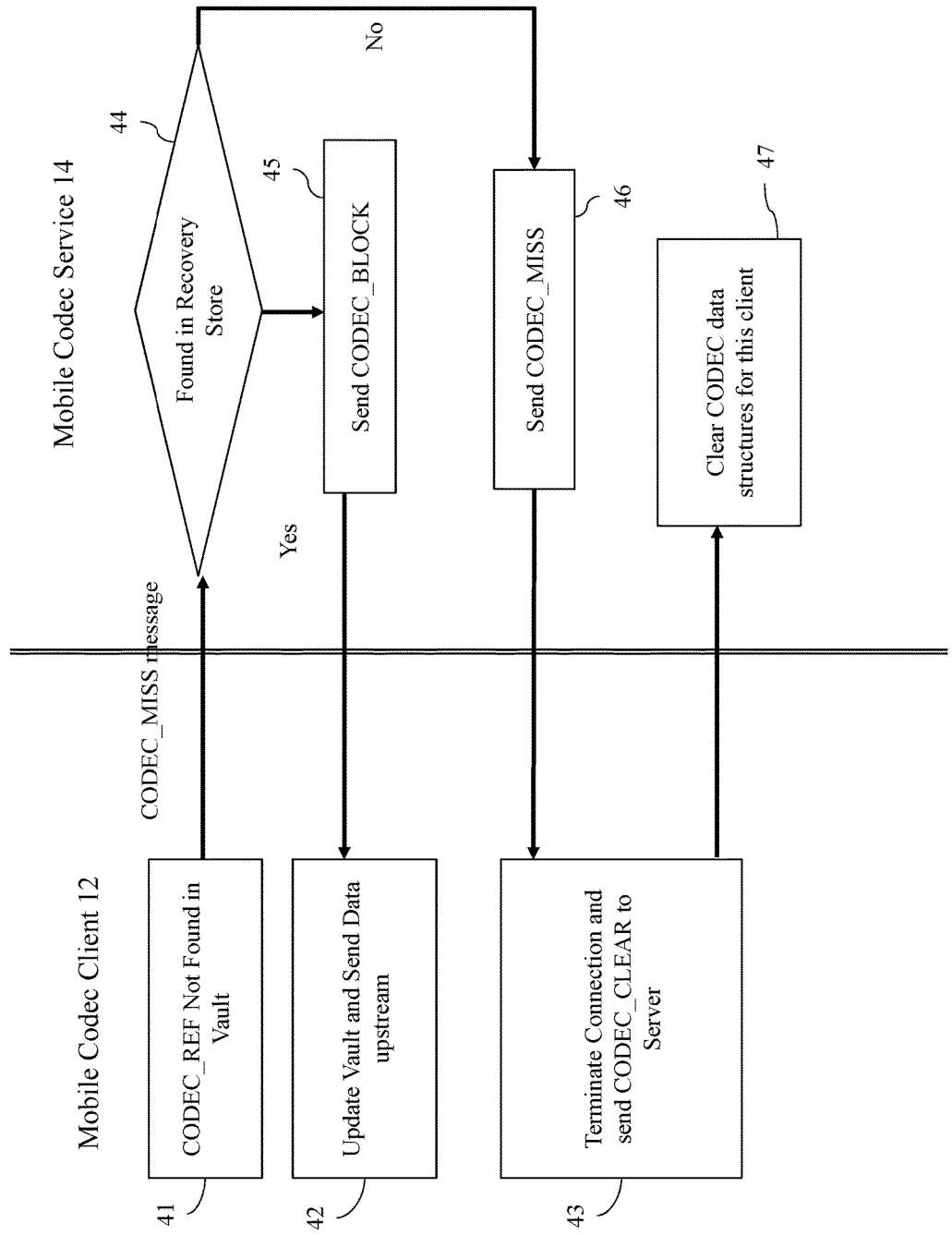
FIG. 6 is a flow chart illustrating one embodiment of a codec miss recovery process.

FIG. 6 is a flow chart of the Codec Miss Recovery Process. When the Mobile Codec Service 14 sends a CODEC_REF message to the Mobile Codec Client 12, and the Mobile Codec Client 12 does not find a matching block in its Vault 13 (step 41), the Mobile Codec Client 12 sends a CODEC_MISS message to the Mobile Codec Service 14. This situation can arise due to network issues or the client clearing its vault, but not able to inform the Mobile Codec Service 14 and other conditions. The CODEC MISS message contains the sequence number, adler and MD5 digest of the missed block. The Mobile Codec Service keeps in its recovery store, M most recently sent blocks. The number M is configurable based on the available memory and disk space on the machine running the Mobile Codec Service 14. On receiving the CODEC_MISS message, in step 44, the Mobile Codec Service 14 checks its recovery store to see there is a matching entry among the most recently sent blocks. If yes, in step 45, the Mobile Codec Service 14 sends a CODEC_BLOCK message to the Mobile Codec Client 12 to update its Vault 13 with this block at the sequence number. On receiving the CODEC_BLOCK message in step 42, the Mobile Codec Client 12 updates its Vault 13 and continues processing as described in FIG. 5. If the answer in step 44 is no, in other words, the Mobile Codec Service 14 did not find a matching block in its recovery store, this is an irrecoverable failure and the Mobile Codec Service 14 sends a CODEC_MISS message back to the Mobile Codec Client 12, in step 46. On receiving the CODEC_MISS, in step 43, the Mobile Codec Client 12 clears its Vault 13 and sends a CODEC_CLEAR message to the Mobile Codec Service 14 to clear its data structures for this client. In step 47, on receiving the CODEC_CLEAR message, the Mobile Codec Service 14 clears its data structures for the Mobile Codec Client 12.

In an alternative embodiment, the Codec Recovery Service of FIG. 6 can also keep track of the sequence numbers that are missing at the Mobile Codec Client 12 and selectively clearing only portions of the Vault 13 and the corresponding data structures on the Mobile Codec Service 14. For example, if block sequence number S is a codec miss, then only blocks of sequence numbers greater than S can be cleared as the blocks with lesser sequence numbers are still valid.

For the sake of simplicity, the Mobile Codec Service 14 is illustrated to be running on a single machine. In another embodiment, the Mobile Codec Service 14 can be run on a cluster of machines to support load balancing and/or failover, with appropriate changes to the Mobile Codec Service 14 for sharing Codec Recovery Store and distribution and synchronization of servicing various Mobile Clients 12 amongst the cluster of machines.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for reducing traffic between one or more mobile clients and a destination server over a network, comprising:

intercepting a network request from a selected mobile client to the destination server via a mobile codec service;

relaying the network request to the destination server via the mobile codec service;

receiving a network response for the network request from the destination server at the mobile codec service; and providing a codec response to a mobile codec client of the selected mobile client via the mobile codec service, the codec response including blocks of bytes representing the network response and eliminating duplicate byte patterns of the network response based on a local vault of the mobile codec client, wherein the mobile codec service populates the local vault with the duplicate byte patterns.

2. The method of claim 1, further comprising reconstructing the network response at the mobile codec client based on the local vault.

3. The method of claim 1, further maintaining a hash table of entries maintained in the local vault at the mobile codec service.

4. The method of claim 1, wherein said providing the codec response further comprises identifying weak block matches using a rolling adler.

5. The method of claim 1, wherein said providing the codec response further comprises identifying strong block matches using a MD5 digest.

6. The method of claim 1, further comprising storing a hash of the blocks of bytes at the mobile codec service.

7. The method of claim 1, further comprising compressing the codec response.

8. The method of claim 1, further comprising recovering missed blocks via a recovery store of the mobile codec service.

9. The method of claim 1, further comprising recovering missed blocks via a last sequence number.

10. A mobile codec system for reducing traffic between one or more mobile clients and a destination server over a network, comprising:

a mobile codec service; and one or more mobile codec clients in communication with said mobile codec service, each mobile codec client running on a selected mobile client and maintaining a local vault accessible by said mobile codec service, wherein said mobile codec service relays a network request from the selected mobile client to the destination server, receives a network response from the destination server, and provides a codec response to the mobile codec client of the selected mobile client, the codec response including blocks of bytes representing the network response and eliminating duplicate byte patterns of the network response based on the local vault of the selected mobile codec client, and wherein said mobile codec service populates the duplicate byte patterns in the local vault.

11. The mobile codec system of claim 10, wherein each local vault maintains the blocks of bytes.

12. The mobile codec system of claim 11, wherein said mobile codec service maintains a hash of said blocks of bytes.

13. The mobile codec system of claim 10, wherein each local vault includes at least one of a hash table, a hash table of hash values, an in memory database, an on disk database, and a most recently used block.

14. The mobile codec system of claim 10, further comprising a recovery store disposed within said mobile codec service for recovering missed block messages.

15. The mobile codec system of claim 10, wherein said one or more mobile codec clients reconstruct the network response based on the local vault.

16. The mobile codec system of claim 10, wherein said mobile codec service further identifies weak block matches using a rolling adler.

17. The mobile codec system of claim 10, wherein said mobile codec service further identifies strong block matches using a MD5 digest.

18. The mobile codec system of claim 10, wherein said mobile codec service further compresses the codec response.

19. The mobile codec system of claim 10, wherein said mobile codec service further comprises a recovery store for recovering missed blocks.

20. The mobile codec system of claim 10, wherein said mobile codec service further recovers missed blocks via a last sequence number.

* * * * *